United States Patent Office 2,783,265
Patented Feb. 26, 1957

2,783,265

PREPARATION OF PHENYLACETONITRILES

Marrine A. Terpstra, Kirkwood, Mo., assignor to Monsanto Chemical Company, St. Louis, Mo., a corporation of Delaware No Drawing. Application December 20, 1954,
Serial No. 476,560

8 Claims. (Cl. 260—465)

This invention relates to the preparation of arylacetonitriles and more specifically pertains to the preparation of phenylacetonitriles.

Phenylacetonitriles are useful intermediates in the synthesis of complex organic compounds such as dyes and pharmaceuticals. For example, the dialkoxy phenylacetonitriles can be employed in the synthesis of papaverine and analogues of papaverine which are useful as antispasmodics.

Numerous methods have been proposed for the preparations of phenylacetonitriles, and, although the best reported laboratory yields have been in the range of 70% to 75%, these processes are not satisfactory for industrial application. For example, it has been proposed that 3,4-dimethoxy phenylacetonitrile be prepared by reacting potassium cyanide or sodium cyanide with veratryl chloride in a benzene solution. Yields of the desired nitrile of 71% to 75% are reported. However, much lower yields are encountered on an industrial scale due to the long reaction period. Since the phenylacetonitriles are in general unstable to heat, too great a quantity of the desired product is wasted during the reaction because of the necessity of long periods of heating in large industrial reaction equipment.

Other proposed processes employ complex and expensive starting materials. For example, it has been proposed to prepare 3,4-dimethoxy phenylacetonitrile by refluxing homoveratradioxime with acetic anhydride; or through the reaction of veratraldehyde with rhodanine followed by hydrolysis, oximation, dehydration and decarboxylation; or from beratraldehyde through 3,4-dimethoxy mandelonitrile benzoate. Obviously these processes either involve so many process steps or such expensive reactants that they are not suitable for large scale industrial manufacture of an intermediate for a multi-step synthesis.

It is an object of this invention, therefore, to provide an improved direct process for preparing phenylacetonitriles. It is also an object of this invention to provide an improved process for the manufacture of phenylacetonitriles which is suitable for industrial practices and from which satisfactory yields of the desired nitriles can be obtained.

These and other objects can be accomplished by an improved process for preparing phenylacetonitriles by the reaction of a benzyl halide; that is, benzyl halide or nuclear substituted benzyl halides, with an alkali metal cyanide. The improved process with which this invention is concerned comprises slowly adding a solution of benzyl halide in a water-immiscible solvent to an aqueous solution of an alkali metal cyanide containing a N,N-dialkyl cyclohexylamine heated to its reflux temperature and maintaining the resulting reaction mixture at its reflux temperature for a short period of time after all the reactants have been combined. Better contact between the reactants is achieved by stirring the aqueous medium while the solution of the benzyl halide is being added and while the entire reaction medium is maintained under reflux conditions. The desired phenylacetonitrile can be readily recovered from the resulting reaction medium by separating the aqueous phase from the organic phase merely by permitting the reaction medium to settle. It is, of course, desirable to make sure the organic layer does not contain unreacted alkali metal cyanides. Washing the organic layer with water is sufficient to remove the last trace of unreacted cyanide. The organic layer is then subjected to distillation, preferably at reduced pressure to keep at a minimum the exposure of the nitrile to elevated temperatures, in excess of about 100° C., while removing the solvent. The nitrile product can be still further purified by fractionation at reduced pressure again to keep the heating of the nitrile product at a minimum. Even after such a purification process yields of the desired phenylacetonitriles of about 85% are obtainable from the process of this invention.

Any water-soluble cyanide can be employed in the process of this invention however, because of their reactivity the alkali metal cyanides and especially sodium and potassium cyanides are preferred. Chemically equivalent proportions of the cyanide and halide reactants and preferably in excess of the cyanide reactant are employed.

According to the process of this invention, the benzyl and nuclear substituted benzyl halides are employed in solution in a water immiscible solvent. The reaction can be carried out in the presence of ethers such as diethyl ether and petroleum ether, carbon tetrachloride, chloroform and other common water immiscible reaction diluents. There can also be employed as the solvent for the benzyl halide reactant a liquid hydrocarbon such as the saturated aliphatic hydrocarbons from $C_5$ to $C_{15}$ and the liquid aromatic hydrocarbon as well as chlorinated derivatives of such hydrocarbons. More specifically there can be employed as diluents such liquid hydrocarbons as heptane or a mixture of aliphatic hydrocarbons such as gasoline or kerosene; aromatic hydrocarbons such as benzene, toluene, xylene, trimethylbenzene, ethylbenzene, the ethyltoluenes, propylbenzene, tetramethylbenzenes and the like; as well as mixtures of aromatic hydrocarbons. The liquid chlorinated derivatives of aliphatic and aromatic hydrocarbons which can be employed are, for example, mono- and dichlorobutanes, mono- and dichloropentanes, mono- and dichloroheptanes, monochlorobenzene, monochlorotoluenes and the like. In the selection of the solvent consideration should be given to the use to which the nitrile is to be put. For example, if the subsequent reaction is carried out at elevated temperatures, a high boiling liquid diluent will be desirable. If the subsequent reaction is carried out at a low temperature, room temperature or below, a low boiling liquid can be used as a reaction diluent. However, the choice of reaction diluent or solvent for the halide reactant and the nitrile product is not critical to the reaction as long as the diluent is inert.

The preferred halides which can be employed as reactants according to this invention possess the formula

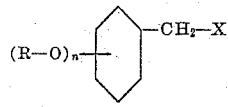

wherein R is an alkyl group containing one to five carbon atoms, X is a halide such as chlorine, bromine, iodine or fluorine and $n$ is a number from 1 to 3 inclusive. Since the chlorides are probably the more readily obtainable reactants, they are the preferred reactants. Thus included in the preferred halides reactants are the mono-, di- and trialkoxybenzyl chlorides. R in the above formula can be methyl, ethyl, n-propyl, isopropyl, n-butyl, sec.-butyl, tert.-butyl, amyl, tert.-amyl, isoamyl and the like. R as well as the ring can also contain such substituted groups as halogen, nitro- hydroxy, alkoxy, aryl, alkyl, aroxy, etc. Specific members of this preferred class of chlorides include among others 4-ethoxybenzyl chloride, 2-butoxybenzyl chloride, 2,3-dimethoxybenzyl chloride (o-veratryl chloride), 3,4-dimethoxybenzyl chloride (veratryl chloride), 3,4,5-trimethoxybenzyl chloride, 2,3,5-trimethoxybenzyl chloride, 3-methoxybenzyl chloride, 4-methoxybenzyl chloride, 2,3-diethoxybenzyl chloride, 4-ethoxy-3,5-dimethoxybenzyl chloride, 3-methoxy-4-ethoxybenzylchloride, 3,4-diethoxybenzyl chloride, 3,4-dipropoxybenzylchloride, 3,4 - dibutoxybenzyl chloride, 3,4-diisopropoxybenzyl chloride, 2-propoxybenzyl chloride, 2-isomoxybenzyl chloride, 3-propoxy - 4 - methoxybenzyl chloride, 3-ethoxy-4-isopropoxybenzyl chloride, 3-propoxy-4-ethoxybenzyl chlorides, 3 - isopropoxy - 4-methoxybenzyl chloride, 2-ethoxy-3-methoxy - 5 - nitrobenzyl chloride, 4-ethoxy 2 (and 3) nitro-benzyl chloride, 2,5-dimethoxy - 3 - methylbenzyl chloride, 2,5 - dimethoxy-3,4,6-trimethyl-benzyl chloride, 3,6 - dimethoxy-2,4,5-trimethylbenzyl chloride, 4-hydroxy-3,5-dimethoxybenzyl chloride, 2 - hydroxy - 3 - methoxybenzyl chloride (o-vanillyl chloride), 3-hydroxy-4 - methoxybenzyl chloride (isovanillyl chloride), 4 - hydroxy-3-methoxybenzyl chloride (vanillyl chloride), 2,3 - diethoxy - 5-nitrobenzyl chloride, 2-methoxy-5-propylbenzyl chloride, and 2-isopropoxy-5-methylbenzyl chloride.

As a catalyst for the process of this invention there can be employed any N,N-dialkyl cyclohexylamine, those having from 1 to 8 carbon atoms in the alkyl groups, such as for example N,N-dibutyl cyclohexylamine, N,N - diamyl cyclohexylamine, N,N - diethyl cyclohexylamine, N,N-diisopropyl cylclohexylamine, N,N-diisobutyl cyclohexylamine, N,N-dimethyl cyclohexylamine, N,N-dioctyl cyclohexylamine and N,N-dipropyl cyclohexylamine are preferred.

The following specific examples are illustrative of the process of this invention and are not intended as a limitation thereon. The term "parts" is employed in these examples to indicate parts by weight.

*Example I*

A glass lined reactor equipped with an agitator, a means for measuring the temperature of the reaction medium therein, a port for charging reactants, a bottom outlet for discharge and separation, a decant line, and means for heating and cooling the reaction medium therein, is charged with 67.5 parts of sodium cyanide eggs and 356 parts of water. This mixture is stirred and slowly heated to a temperature of from about 45° C. to about 50° C. to dissolve the sodium cyanide. When the sodium cyanide has all dissolved, 1.4 parts of N,N-dimethyl cyclohexylamine is added to the solution and the resulting mixture is heated to about 55° C. To this hot solution there is slowly added over a period of about one hour, a solution of 138 parts of 3-methoxy-4-ethoxybenzyl chloride in 466 parts of monochlorobenzene with stirring. Some heat is generated by the reaction during this addition period and the reaction temperature is controlled between 55° C. and 60° C. When all of the solution of the dialkoxybenzyl chloride has been added, the resulting reaction mixture is slowly heated to 70° C. over a 30 minute period and maintained at about 70° C. for an additional 30 minutes.

Thereafter the agitation is stopped and the reaction mixture allowed to settle into two layers. The top layer is the organic layer and bottom layer is the aqueous layer containing dissolved by-product sodium chloride, unreacted sodium cyanide and the tertiary amine. The water layer is withdrawn from the reactor and removed to a cyanide "killing" tank. The organic layer is washed with water at 60° C. with stirring for five minutes. On settling, the organic layer is now the bottom layer. The aqueous layer is removed by decantation and combined in the cyanide "killing" tank with the water layer from the reaction medium. The organic layer is washed two more times, each time the water layer is removed to the cyanide "killing" tank. If there is an oil layer on the bottom of the "killing" tank, it is removed and added to the washed monochlorobenzene layer. To the aqueous solution in the cyanide "killing" tank there is added with stirring 50 or more parts of ferrous sulfate until the solution tests negative for cyanide.

The washed organic layer is transferred to distillation equipment, and the monochlorobenzene and a small amount of water are stripped therefrom at 60° to 70° C. as rapidly as possible at reduced pressure by continuously reducing the pressure on the distillation system to about 10 to 15 mm. Hg. The distillation is continued at about 10 to 15 mm. Hg by gradually increasing the temperature to about 130° to 135° C. The residual material is distilled at 5 mm. Hg by collecting the distilled product beginning at 160° to 165° C. and stopping when no product distills off, about 220° C. By this process there is recovered 110 parts of product having a crystallization point of 49° to 52° C. and assaying about 95% 3-methoxy 4-ethoxy phenylacetonitrile.

*Exeample II*

The process described in Example I is repeated except that 609 parts of monochlorobenzene solution containing 143 parts of 3,4-diethoxy benzyl chloride are charged to the reactor containing 68.6 parts of sodium cyanide and 2.5 parts of N,N-diethyl cyclohexylamine in 350 parts of water heated to reflux temperature, about 105° to 110° C. The monochlorobenzene solution is slowly added over a period of about one hour while stirring the resulting reaction mixture. The reaction mixture is maintained at reaction temperature for an hour after the organic solution is added and thereafter the nitrile product is recovered as described in Example I.

There is recovered about 116 parts of product assaying about 90% 3,4-diethoxy phenylacetonitrile.

*Example III*

The process of Example I is repeated except that 528 parts of a monochlorobenzene solution containing 124 parts 3,4-dimethoxybenzyl chloride are slowly added over a period of about one hour to the reactor containing 59.5 parts of sodium cyanide and 1.5 parts of N,N-dibutyl cyclohexylamine at 105° C. The nitrile product is washed and recovered as described in Example I.

There is recovered about 104 parts of product assaying about 95% 3,4-dimethoxy phenylacetonitrile.

*Example IV*

The process of Example I is repeated except that 480 parts of monochlorobenzene solution containing 84 parts of benzyl chloride are charged slowly to a reactor containing a stirred solution of 40.4 parts of sodium cyanide and 1.0 part of N,N-dimethyl cyclohexylamine in 300 parts of water heated to its reflux temperature. After heating the reaction mixture at reflux temperature for an hour after all the reactants are combined, the nitrile product is washed and recovered as described in Example I.

By this process there can be obtained about 70 parts of product assaying about 95% phenylacetonitrile, about an 85% yield of the nitrile.

The process of this invention as illustrated by the foregoing examples can be employed in the preparation of other phenylacetonitriles of the class hereinbefore set forth. For example, 4-methyl phenylacetonitrile can be prepared from 4-methylbenzyl chloride by the reaction with potassium cyanide in the presence of N,N-dimethyl cyclohexylamine employing a solution of the chloride in benzene or toluene and an aqueous solution of the cyanide and the amine. Also there can be employed as the halide reactant, diphenylmethyl chloride, o- and m-ditolylmethyl chloride, diphenylmethyl chloride, o-benzylbenzyl chloride, p-chlorodiphenylmethyl chloride (the product being a dinitrile), o- and p-ethylbenzyl chloride, p-isopropylbenzyl chloride, 2,3-dimethylbenzyl chloride, 2,5-dimethylbenzyl chloride, 3,5-dimethylbenzyl chloride (merityl chloride) tolyl chloride, 2,4,5,6-tetramethylbenzyl chloride, 4-ethoxybenzyl chloride, 2-butoxybenzyl chloride, 2,3-dimethoxybenzyl chloride, 3,4,5-trimethoxybenzyl chloride, 2-hydroxy-3-methoxybenzyl chloride (o-vanillyl chloride), 4-hydroxy 3-methoxybenzyl chloride (vanillyl chloride), 4 - ethoxy-2 - nitrobenzyl chloride among others hereinbefore named.

In contrast to the foregoing processes illustrating the process of this invention, the process of Example I is repeated except that no N,N-dimethyl cyclohexylamine is employed. The yield of the recovered 3-methoxy-4-ethoxy phenylacetonitrile is about 75%.

To those skilled in the art many obvious deviations from the precise manipulative steps set forth in the specific examples will be apparent, also the precise quantities of materials employed can be adjusted according to the sized limitations of the equipment employed. Hence, it is to be understood that the above description is given by way of illustration only and not of limitation and that deviations are possible within the spirit of the invention.

What is claimed is:

1. In the process for preparing a phenylacetonitrile by the reaction of a benzyl halide with an alkali metal cyanide, the steps comprising adding a solution of a benzyl halide dissolved in a water immiscible solvent to an aqueous solution containing alkali metal cyanide and a N,N-dialkyl cyclohexylamine heated to its reflux temperature and maintaining the resulting mixture at its reflux temperature.

2. In the process for preparing a dialkoxy phenylacetonitrile by the reaction of a dialkoxybenzyl chloride with an alkali metal cyanide, the steps comprising adding a solution of the dialkoxybenzyl chloride in a water immiscible liquid solvent to an aqueous solution containing an alkali metal cyanide and N,N-dialkyl cyclohexylamine heated to its reflux temperature and maintaining the resulting mixture at its reflux temperature.

3. In the process for preparing a dialkoxy phenylacetonitrile by the reaction of a dialkoxybenzyl chloride with sodium cyanide, the steps comprising adding a solution of the dialkoxybenzyl chloride in monochlorobenzene to an aqueous solution containing sodium cyanide and N,N-dialkyl cyclohexylamine heated to its reflux temperature and maintaining the resulting mixture at its reflux temperature.

4. The method for preparing 3,4-dimethoxy phenylacetonitrile according to the process of claim 3 wherein the dialkoxybenzyl chloride is 3,4-dimethoxybenzyl chloride.

5. The method for preparing 3-methoxy-4-ethoxy phenylacetonitrile according to the process of claim 3 wherein the dialkoxybenzyl chloride is 3-methoxy-4-ethoxybenzyl chloride.

6. The process of claim 2 wherein the water-immiscible solvent is toluene.

7. In the process for preparing a dialkoxy phenylacetonitrile by the reaction of a dialkoxybenzyl chloride with sodium cyanide, the steps comprising adding a solution of the dialkoxybenzyl chloride in monochlorobenzene to an aqueous solution containing sodium cyanide and N,N-dimethyl cyclohexylamine heated to its reflux temperature and maintaining the resulting mixture at its reflux temperature.

8. In the process for preparing a dialkoxy phenylacetonitrile by the reaction of a dialkoxybenzyl chloride with sodium cyanide, the steps comprising adding a solution of the dialkoxybenzyl chloride in monochlorobenzene to an aqueous solution containing sodium cyanide and N,N-diethyl cyclohexylamine heated to its reflux temperature and maintaining the resulting mixture at its reflux temperature.

References Cited in the file of this patent

UNITED STATES PATENTS

| 2,195,076 | Braun et al. | Mar. 26, 1940 |
| 2,695,319 | Dengel | Nov. 23, 1954 |

FOREIGN PATENTS

| 716,866 | Great Britain | Oct. 13, 1954 |